United States Patent
Kang

(10) Patent No.: US 10,989,342 B2
(45) Date of Patent: Apr. 27, 2021

(54) DEPRESSOR-ADJUSTMENT UNIT AND MANIFOLD GAUGE SET INCLUDING THE SAME

(71) Applicant: Sugjae Kang, Seoul (KR)

(72) Inventor: Sugjae Kang, Seoul (KR)

(*) Notice: Subject to any disclaimer, the term of this patent is extended or adjusted under 35 U.S.C. 154(b) by 372 days.

(21) Appl. No.: 15/770,725

(22) PCT Filed: Nov. 2, 2016

(86) PCT No.: PCT/KR2016/012500
§ 371 (c)(1),
(2) Date: Apr. 24, 2018

(87) PCT Pub. No.: WO2017/078388
PCT Pub. Date: May 11, 2017

(65) Prior Publication Data
US 2019/0078715 A1    Mar. 14, 2019

(30) Foreign Application Priority Data

Nov. 3, 2015   (KR) .................. 10-2015-0153966
Nov. 24, 2015  (KR) .................. 10-2015-0164449
Dec. 11, 2015  (KR) .................. 10-2015-0176605
Jun. 21, 2016  (KR) .................. 10-2016-0076950

(51) Int. Cl.
| | | |
|---|---|---|
| *F16L 37/086* | (2006.01) | |
| *G01K 1/14* | (2021.01) | |
| *G01D 11/30* | (2006.01) | |
| *F16C 1/22* | (2006.01) | |
| *F16K 31/46* | (2006.01) | |
| *G01L 19/00* | (2006.01) | |
| *F16L 29/00* | (2006.01) | |
| *G01F 15/18* | (2006.01) | |

(Continued)

(52) U.S. Cl.
CPC ............ *F16L 37/086* (2013.01); *F16C 1/226* (2013.01); *F16K 31/465* (2013.01); *F16L 29/007* (2013.01); *F16L 37/413* (2013.01); *G01D 11/30* (2013.01); *G01F 15/18* (2013.01); *G01F 15/185* (2013.01); *G01K 1/14* (2013.01); *G01L 19/00* (2013.01); *F16L 37/44* (2013.01); *G01L 19/003* (2013.01)

(58) Field of Classification Search
CPC ........ F16L 37/086; F16L 37/413; F16L 29/00
See application file for complete search history.

(56) References Cited

U.S. PATENT DOCUMENTS

| | | | | |
|---|---|---|---|---|
| 2,936,183 A | * | 5/1960 | Basham .................. | A62B 9/04 137/614.05 |
| 2007/0292282 A1 | * | 12/2007 | Schuetzle ............... | F04B 35/04 417/273 |
| 2010/0068954 A1 | | 3/2010 | Tanaka et al. | |

FOREIGN PATENT DOCUMENTS

| | | |
|---|---|---|
| JP | 2004-211818 A | 7/2004 |
| JP | 2008-082543 A | 4/2008 |

(Continued)

*Primary Examiner* — Angelisa L. Hicks
(74) *Attorney, Agent, or Firm* — Heedong Chae; Lucem, PC

(57) ABSTRACT

In accordance with the present disclosure, leak of gas is suppressed when a coupler of a manifold gauge set including a gas hose is detached to a gas inlet/outlet valve of a thermal exchange equipment. To this end, the set includes a core-rod depressor extending from the coupler into the hose, and a depressor-adjustment unit disposed on the hose to adjust a position of the core-rod depressor.

1 Claim, 11 Drawing Sheets

(51) Int. Cl.
*F16L 37/413* (2006.01)
*F16L 37/44* (2006.01)

(56) References Cited

FOREIGN PATENT DOCUMENTS

| KR | 10-2009-0082604 A | 7/2009 |
|----|-------------------|--------|
| KR | 20-0452735 Y1 | 3/2011 |

* cited by examiner

-- PRIOR ART --

-- PRIOR ART --

DEPRESSOR-ADJUSTMENT UNIT AND MANIFOLD GAUGE SET INCLUDING THE SAME

TECHNICAL FIELD

The present disclosure relates to a depressor-adjustable unit and a manifold gauge set comprising the same. In a prior art, a coupler 1 of the manifold gauge set is coupled to a gas inlet/outlet valve 7 installed in a heat exchange equipment such as a refrigerator, an air conditioner, etc. in order to inject/discharge/inspect a refrigerant. However, when the coupling has not been completed, a fixed core depressor 10 inside the coupler 1 starts to push a core-rod of the gas inlet/outlet valve 7. Thus, a large amount of the refrigerant may leak into the atmosphere. In accordance with the present disclosure, to prevent this, the fixed core depressor 10 of the coupler 1 is replaced with an extendable or retractable core-rod depressor 12 to push the core-rod while the coupling has been completed.

RELATED ART

Conventionally, a manifold gauge set includes a gauge body and a number of hoses 6, each hose 6 including a coupler 1 fastened thereto. The coupler 1 includes a fixed core depressor 10 disposed therein, which is a protruded portion. Further, a heat exchange equipment such as a refrigerator, an air conditioner, etc. has a gas inlet/outlet valve 7 through which a refrigerant may be injected, discharged or inspected thereto. The gas inlet/outlet valve 7 may be embodied as a Schrader valve. The Schrader valve includes a valve core 8. Moreover, the valve core 8 includes a core-rod 9 comprising a spring and a rubber packing. When the core-rod 9 is pressed, the gas inlet/outlet valve 7 is opened. When the core-rod 9 is released, the core-rod 9 returns to an original state thereof by an elastic force of the spring, and, thus, the valve is closed. An inner female thread is formed in an inner face of the coupler 1, while an outer male thread is formed in an outer face of the gas inlet/outlet valve 7. In this way, the coupler 1 may be rotatably coupled to the gas inlet/outlet valve 7.

When the coupler 1 of the manifold gauge set starts to be coupled to the gas inlet/outlet valve 7 of the heat exchange equipment, the fixed depressor 10 pushes the core-rod 9 to allow opening a gas flow channel. At this time, the gas inlet/outlet valve 7 is in a partially-opened state. Further, when the coupling has been completed, the gas inlet/outlet valve 7 and the coupler 1 are brought into tight contact with each other to ensure airtightness therebetween and to complete the opening of the channel.

However, a large amount of gas may be leaked into the atmosphere during coupling/decoupling the coupler 1 to/from the gas inlet/outlet valve 7 of the heat exchange equipment such as an air conditioner receiving a high pressure gas therein.

SUMMARY

When the hoses 6 of the manifold gauge set are coupled, via the coupler 1, to the gas inlet/outlet valve 7 of the heat exchange equipment such as the air conditioner, the coupler 1 is rotated so that the fixed depressor 10 pushes up the core-rod 9 of the gas inlet/outlet valve 7 such as a Schrader valve. Thus, the gas inlet/outlet valve 7 is opened to allow gas-communication between the valve and the hose. At this time, before the coupler 1 is completely coupled to the gas inlet/outlet valve 7, the core-rod 9 begins to be pushed up. When the coupling has been completed, the pushing up is terminated.

In this process, when there is a high pressure gas inside the equipment, and the equipment is in the open state for a while, a large amount of gas may be released, thereby causing burns of the operator, gas poisoning of the operator, and loss of the gas.

In addition, the core-rod 9 of the gas inlet/outlet valve 7 may not be able to open the core-rod 9 due to an insufficient degree of protrusion of the rod 9.

Moreover, the conventional manifold gauge set has no discharge fold. Thus, it is difficult to safely discharge the exhaust gas from the gas inlet/outlet valve 7 and the residual gas from the manifold gauge set.

Furthermore, a coupling neck 20 bent at 45 degrees is disposed between the hose 6 of the manifold gauge set and the coupler 1. Correspondingly, the coupler 1 is bent. Thus, when the coupler 1 is coupled to the gas inlet/outlet valve 7, the directions of the coupler 1 and the gas inlet/outlet valve 7 are not aligned with each other.

A manifold gauge set comprises a hose having a coupler at a distal end thereof, wherein the coupler is detachably coupled to a gas inlet/outlet valve; a movable depressor extending from the coupler into the hose; and a depressor-adjustment unit configured to adjust a position of the depressor, wherein the unit is installed on the hose.

The hose is divided into first and second sub-hoses with the depressor-adjustment unit being interposed between the first and second sub-hoses, wherein the depressor-adjustment unit includes a hollow cylinder coupled to one of the first and second sub-hoses, and a hollow plunger coupled to the other of the first and second sub-hoses, wherein the plunger is slidably received in the cylinder.

The depressor-adjustment unit includes a transparent portion to allow checking of a position of the depressor in the unit. The transparent portion has a reference line formed thereon.

The core-rod depressor is connected to the depressor-adjustment unit via a depressor-pushing spring loaded on an end of the depressor. The core-rod depressor and the depressor-pushing spring may be connected via a rotatable connection element with each other or may be directly connected with each other.

The depressor is received in a guide tube, wherein the depressor 12 has an outer male thread 52 defined in an outer face thereof, wherein the guide tube has an inner female thread 51 defined in an inner face thereof, wherein the outer and inner male threads are engaged with each other.

The hose 6 is divided into first and second sub-hoses with the depressor-adjustment unit 3 being interposed between the first and second sub-hoses, wherein the depressor-adjustment unit includes: first and second hollow plungers 28 coupled to the first and second sub-hoses respectively; and a hollow cylinder 55 constructed to receive the first and second plungers, wherein the plungers are slidably received in the cylinder.

A manifold gauge set comprise: a hose; a bent portion having a first end coupled to a distal end of the hose; a coupler coupled to a second end of the bent portion, wherein the first and second ends are opposite to each other, wherein the coupler is detachably coupled to a gas inlet/outlet valve; and a depressor-adjustment unit disposed on the hose at the first end of the bent portion; and a movable depressor extending through the coupler and the bent portion to the depressor-adjustment unit.

A manifold gauge set includes a hose having a coupler at a distal end thereof, wherein the coupler is detachably coupled to a gas inlet/outlet valve; an elongated hollow tube extending in the hose in a longitudinal direction thereof, wherein an extension axis of the tube is angled with an extension axis of the hose; a movable depressor extending in the tube along the extension axis of the tube; and a depressor-adjustment unit configured to adjust a position of the depressor, wherein the unit is coupled to the hose.

The depressor is received in a guide tube, wherein the depressor 12 has an outer male thread 52 defined in an outer face thereof, wherein the guide tube has an inner female thread 51 defined in an inner face thereof, wherein the outer and inner male threads are engaged with each other. A handle is coupled to the depressor-adjustment unit 3. Via rotation of the handle, the outer and inner male threads rotate in the engaged state to move up the depressor 12.

A discharge fold is coupled to the body of the manifold gauge set.

The hose may be embodied as a discharge fold.

According to the present disclosure, when the process of coupling the coupler 1 of the hose 6 of the manifold gauge set to the gas inlet/outlet valve 7 of the heat exchange equipment has been completed, the core-rod depressor 12 pushes the core-rod 9. Thus, this may prevent gas leak due to the gas-tightness between the valve and coupler, thereby protecting an operator from burns and toxic gas poisoning, protecting the environment and saving the gas.

Further, the position of the core rod of the valve may be easily confirmed from the outside of the gauge hose 6 with the naked eye. Thus, it may be ensured that the core rod reliably reaches to an open state of the valve.

In addition, the discharge fold is additionally provided in the manifold gauge set to securely discharge the exhaust gas from the gas inlet/outlet valve 7 and the residual gas inside the manifold gauge set.

Further, in a prior art, a coupling neck 20 bent at 45 degrees is disposed between the hose 6 of the manifold gauge set and the coupler 1. Correspondingly, the coupler 1 is bent. Thus, when the coupler 1 is coupled to the gas inlet/outlet valve 7, the directions of the coupler 1 and the gas inlet/outlet valve 7 are not aligned with each other. However, in accordance with the present disclosure, the hose is freely rotated so that the coupling directions of the coupler 1 and the gas inlet/outlet valve 7 may be aligned with each other.

REFERENCE NUMERALS

Figure 1A:
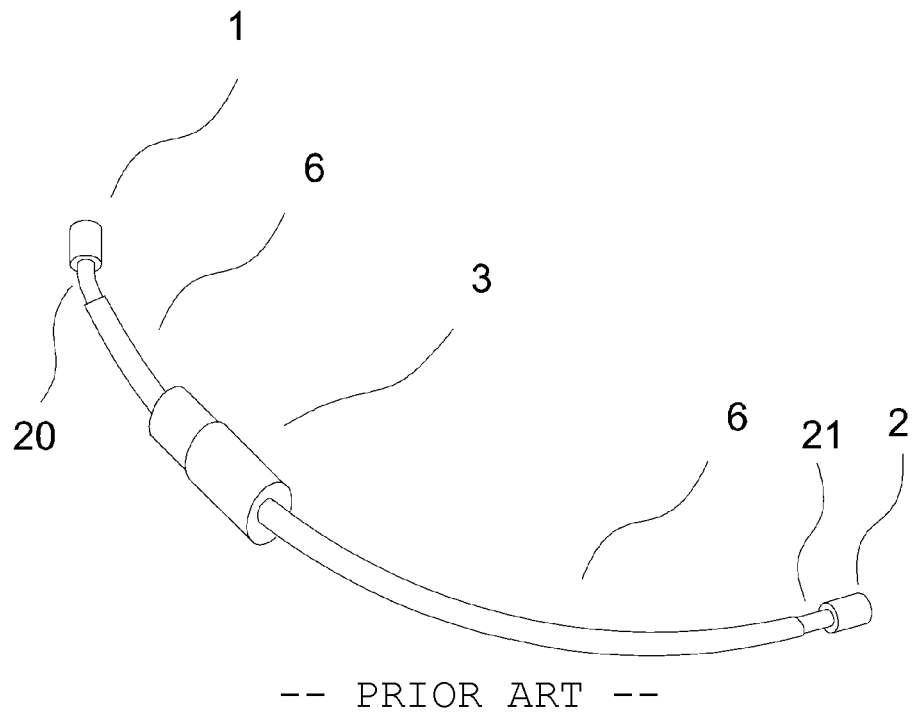
FIG. 1A shows a perspective view of a hose with a depressor-adjustment unit and a coupler.
Figure 1B:
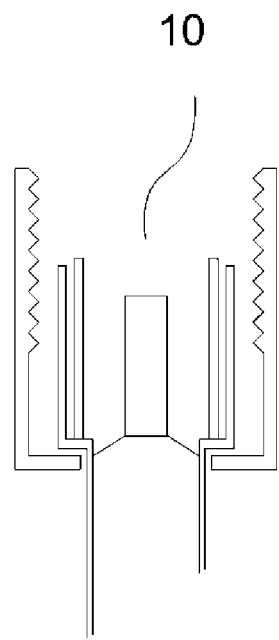
FIG. 1B shows a cross sectional view of the coupler in accordance with a prior art.

1: coupler
3: depressor-adjustment unit
6: hose
7: gas inlet/outlet valve
8: valve core
9: core-rod
10: fixed depressor
11: guide tube
12: core-rod depressor
15: fixing member
17: rotatable connection
18: flexible member
19: support
20: coupling neck
22: upper depressor-adjustment sub-unit
23: lower depressor-adjustment sub-unit
26: first outer male thread
27: packing member
28: plunger
32: rotatable portion
35: first inner female thread
36: cylinder portion
37: transparent portion
39: depressor-pushing spring
41: reference line
42: marker
45: depressor-pulling spring
46: adjustment plate
48: through-hole
51: second inner female thread
52: second outer male thread
55: rotatable cylinder portion
58: packing member receiving groove
60: second elongated hollow tube
61: stopper
71: depressing rod
82: bent portion
84: slit
85: adjustment button
86: proximal opening
87: distal opening
88: elongated hollow tube
89: adhering face
90 body 91: connector
92: rotation handle
98: packing member
101: discharge fold adjustment unit
102: pressure gauge
103: high pressure adjustment unit
104: high pressure fold
105: discharge fold
106: inject fold
107: low pressure fold
108: low pressure adjustment unit

DETAILED DESCRIPTIONS

The accompanying drawings, which are incorporated in and form a part of this specification and in which like numerals depict like elements, illustrate embodiments of the present disclosure and, together with the description, serve to explain the principles of the disclosure. The terminology used herein is for the purpose of describing particular embodiments only and is not intended to be limiting of the present disclosure.

It will be understood that the description herein is not intended to limit the claims to the specific embodiments described. On the contrary, it is intended to cover alternatives, modifications, and equivalents as may be included within the spirit and scope of the present disclosure as defined by the appended claims.

Figure 2A:
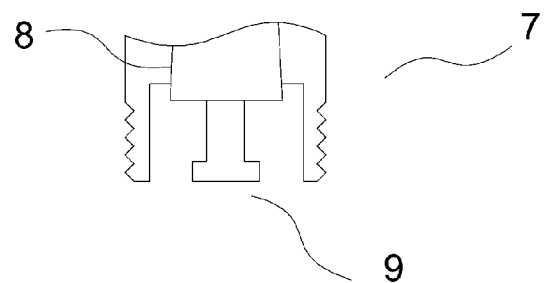
FIG. 2A shows a sectional view of a gas inlet/outlet valve of a mechanical equipment.
Figure 2B:
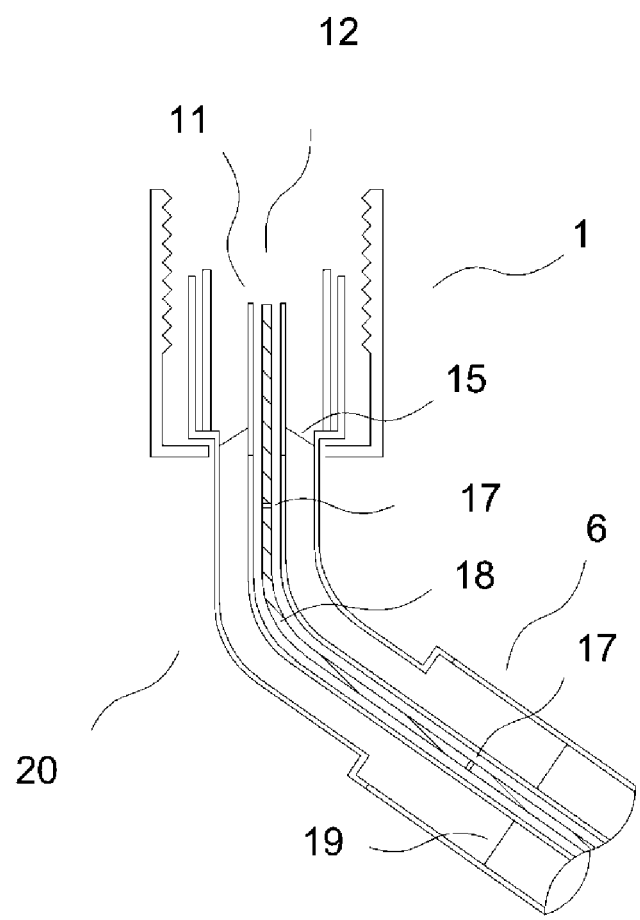
FIG. 2B shows a sectional view a coupler in accordance with a first embodiment of the present disclosure.

In a first embodiment, as shown in FIGS. 2A and 2B, the present invention relates to a manifold gauge set including: a hose having a coupler at a distal end thereof, wherein the coupler is detachably coupled to a gas inlet/outlet valve, wherein the valve is opened/closed by a movement of a core-rod resulting from a depressing of a core-rod depressor; the core-rod depressor extending from the coupler into the hose; and a depressor-adjustment unit configured to adjust a position of the depressor, wherein the unit is installed on the hose. This configuration is to prevent the leakage of gas when coupling the coupler 1 of the manifold gauge set to the gas inlet/outlet valve 7 of a heat exchange equipment such as a refrigerator, or, an air conditioner, etc. Herein, the coupler 1 refers to a connection port to the gas inlet/outlet valve/outlet valve 7.

Figure 3:
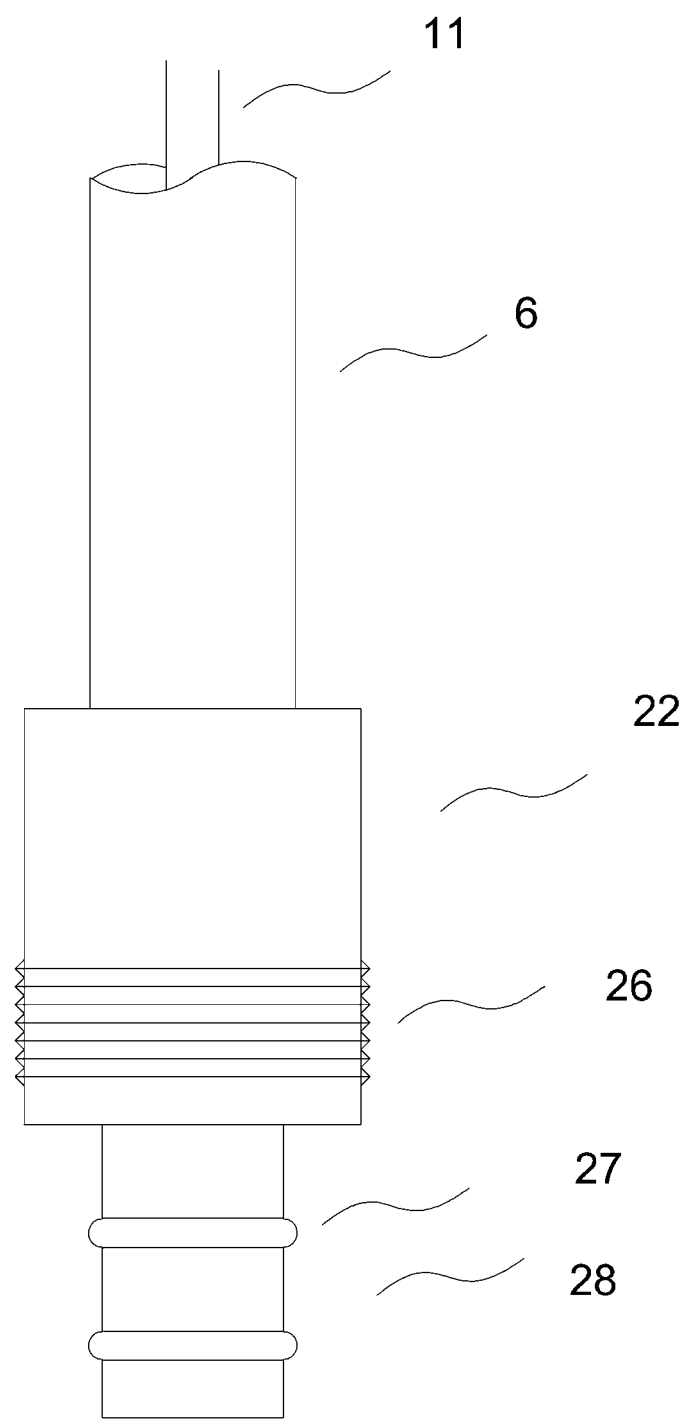
FIG. 3 shows a front view of an upper depressor-adjustment sub-unit in accordance with a first embodiment of the present disclosure.
Figure 4:
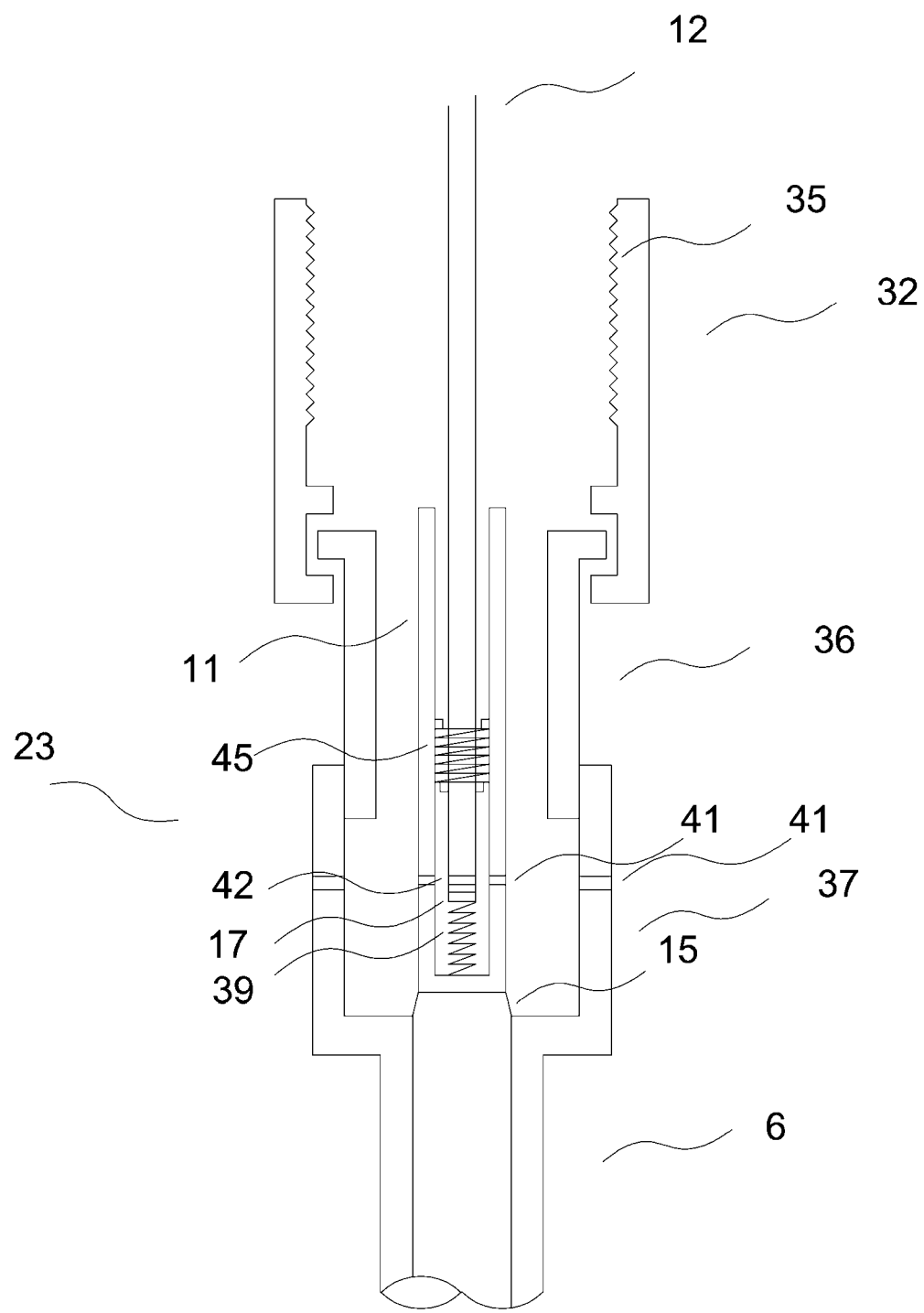
FIG. 4 shows a sectional view of a lower depressor-adjustment sub-unit in accordance with a first embodiment of the present disclosure.

Specifically, the depressor-adjustment unit 3 installed on the hose near from the coupler 1 divides the hose into two portions. The core-rod depressor extending from the coupler 1 to the depressor-adjustment unit is received in the hose. Further, the depressor adjustment unit 3 adjust a position of the depressor to open/close the gas inlet/outlet valve 7. Further, a guide tube 11 is configured to guide the core-rod depressor from the coupler 1 to the depressor adjustment unit 3. The guide tube may be disposed only in a required region. The guide tube 11 includes a fixing member 15 connected to one end thereof. Further, the guide tube 11 may also include a plurality of supports 19 connected to the other end thereof to maintain the same spacing between the wall of the hose and the guide tube. When the guide tube 11 is not needed, the support 19 may be provided on the core-rod depressor 12. The support 19 in a form of a brush may be provided at the guide tube 11 or the core-rod depressor and may be inserted to the hose 6. The depressor-adjustment unit 3 is divided into upper and lower depressor-adjustment sub-units 22 and 23. The upper depressor-adjustment sub-unit 22, as shown in FIG. 3, is connected to the hose 6 at the coupler 1 side while the lower depressor-adjustment sub-unit 23, as shown in FIG. 4, is connected to the hose 6 at the gauge side. A first outer male thread 26 is defined on the body of the upper depressor-adjustment sub-unit 22. Further, a plunger 28 is received in the upper depressor-adjustment sub-unit 22. A packing member receiving groove 58 is defined in the outer face of the plunger 28. A packing member 27 is received in the groove 58. A rotatable portion 32, a cylinder portion 36 and a transparent portion 37 together constitutes the lower depressor-adjustment sub-unit 23. The rotatable portion 32 has a first inner female thread 35 defined in an inner face thereof. The thread 35 is connected to the first outer male thread 26 defined in an outer face of the upper depressor adjustment sub-unit 22. The rotation portion 32 is freely rotatable with respect to the body of the upper depressor-adjustment sub-unit 22. Each of the cylinder portion 36 and the plunger 28 is hollow. The cylinder portion 36 and the plunger 28 are tightly coupled to each other via the packing member 27. The transparent portion 37 is made of a transparent material so that the inside in the transparent portion 37 may be visible from the outside. A reference line 41 may be formed thereon. The core-rod depressor 12 is connected to the depressor-pushing spring 39 at one end thereof. The other end of the depressor-pushing spring 39 is connected to the lower depressor-adjustment unit 23. Further, a marker 42 for comparison with the reference line 41 is defined on the depressor 12. A depressor-pulling spring 45 is loaded on the core-rod depressor 12 to allow the core-rod depressor 12 to be returned to an appropriate position when the rotatable portion 32 is reversely rotated.

Specifically, after the coupler 1 is coupled to the gas inlet/outlet valve 7 of the equipment, the lower depressor-adjustment sub-unit 23 advances toward the upper depressor-adjustment sub-unit 23 via a rotation of the first inner female thread 35. The depressor-pushing spring 39 fixed at one end of the lower depressor-adjustment sub-unit 23 expands and thus the core-rod depressor 12 connected to one end of the depressor-pushing spring 39 moves up. Thus, the core-rod 9 is pushed up by the lifted-up core-rod depressor 12. Correspondingly, the gas inlet/outlet valve is opened. When the opening of the valve via the core-rod 9 is completed, the core-rod 9 is no longer retracted. Therefore, the depressor-pushing spring 39 is excessively loaded and contracts, and the lower end of the core-rod depressor 12 is shown as thrusted downward through the guide tube 11. The movement of the marker 42, which is defined on a lower portion of the core-rod depressor 12 is checked with respect to the reference line 41. This may be visually confirmed through the transparent portion 37. Generally, the connection portion between the hose 6 and the coupler 1 is bent at 45 degrees, which makes it difficult to couple the coupler 1 to the valve. However, according to the present disclosure, one end of the hose is freely rotatable so that the directions of the gas inlet/outlet valve 7 and the coupler 1 are aligned and are easily coupled to each other. A discharge fold 105 and a discharge fold adjustment unit 101, which are required because of the use of the depressor-adjustment unit, are additionally included in the manifold gauge set. In order to decouple the coupler 1 from the gas inlet/outlet valve 7, the rotatable portion 32 of the depressor-adjustment unit is reversely rotated. Thus, the marker returns to the original position. This may be confirmed through the transparent portion 37. A further reverse rotation of the rotatable portion 32 ensures that the core-rod 9 of the gas inlet/outlet valve 7 returns to the original position thereof. Further, a high-pressure gas inside the hose 6 is discharged to the outside through the discharge fold 105. The coupler 1 is decoupled. Each of connections between portions of the core-rod depressor 12 may include a rotatable connection element.

Alternatively, the portions of the elongate depressor may be directly connected to each other. The core-rod depressor 12 may be made of a material having both ductility and rigidity. The core-rod depressor 12 may has a flexible portion 18 having a good ductility in a region near the bent portion of the coupling neck 20 of the coupler 1. In order to prevent separation between the upper depressor-adjustment sub-unit 22 and the lower depressor-adjustment sub-unit 23 from each other, the rotatable portion 32 may have a separation preventing protrusion. The positions of the plunger 28 and the cylinder portion 36 may be exchanged vertically. The depressor-adjustment unit may abut the end of the coupler 1 of the manifold gauge set by shortening the length of the unit. The depressor-pushing spring 39 also acts to allow the core-rod depressor 12 to return. If necessary, a separate depressor-pulling spring 45 may be provided. Since the number of components in the hose 6 increases, the size of the hose 6 may be increased to secure the gas flow channel. The depressor-adjustment unit 3 may be configured in various forms to adjust the position of the core-rod depressor 12. The depressor-adjustment unit 3 may be embodied as a sliding lock structure without a thread in view of its own elasticity of the core-rod depressor 12. In this connection, the sliding lock structure may enter into the valve at one time.

Figure 5:
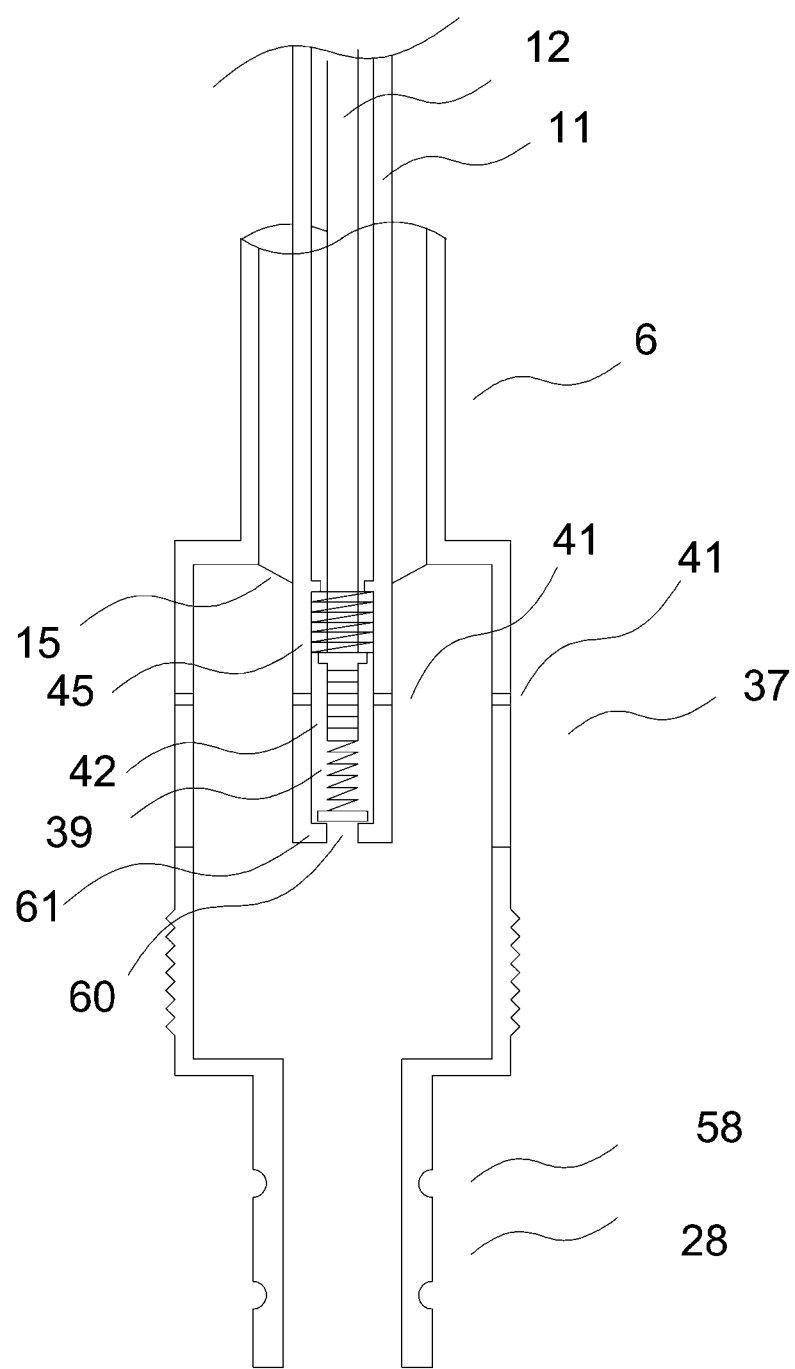
FIG. 5 shows a sectional view of an upper depressor-adjustment sub-unit in accordance with a second embodiment of the present disclosure.
Figure 6:
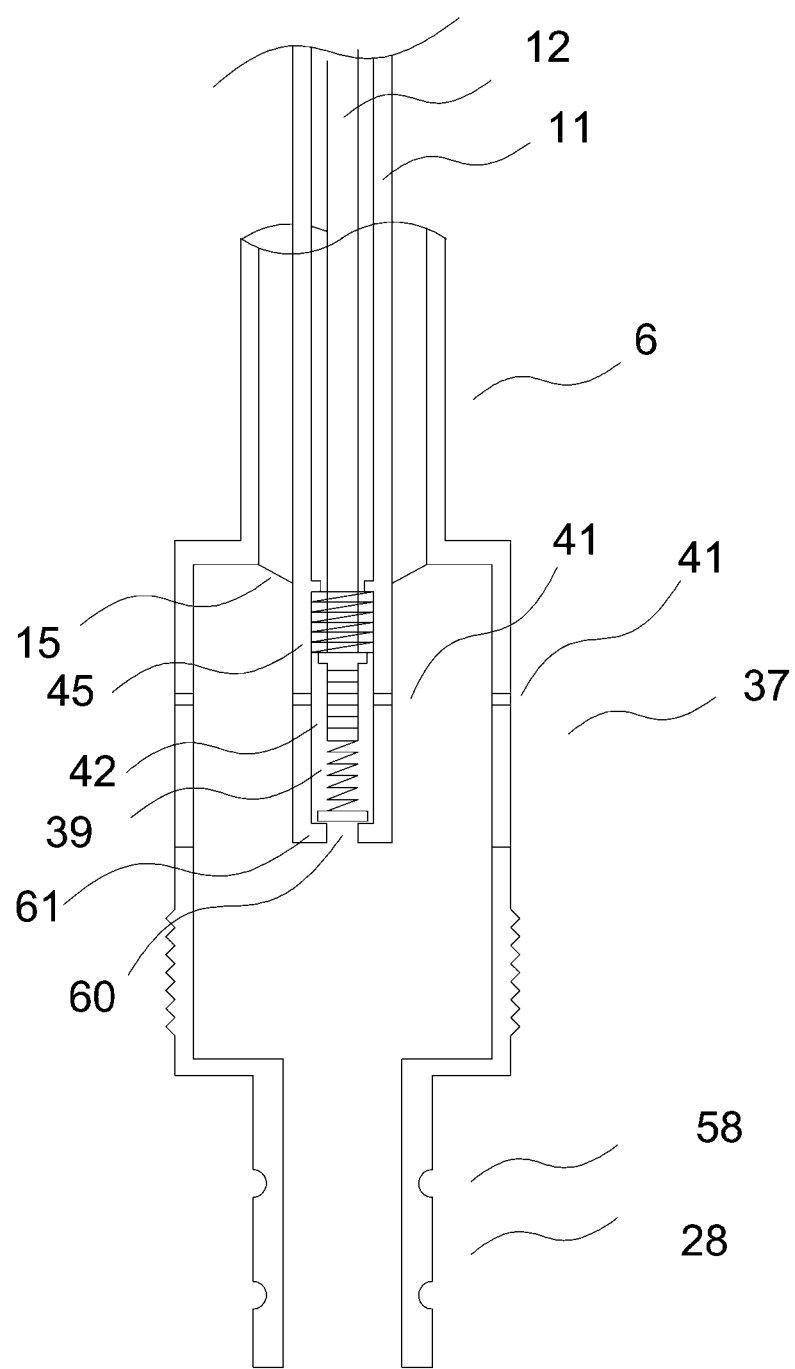
FIG. 6 shows a sectional view of a lower depressor-adjustment sub-unit in accordance with a first embodiment of the present disclosure.

In a second embodiment, the transparent portion 37 is provided as a component of the upper depressor-adjustment sub-unit 22 as shown in FIG. 5 and FIG. 6. The first and second embodiments are generally the same in terms of the configuration. The difference between the first and second embodiments is that the transparent portion 37 is included in the upper depressor-adjustment sub-unit 22. The transparent portion 37 and the guide tube 11 are made of transparent materials. The reference lines 41 are defined thereon, and the marker 42 is defined on the core-rod depressor 12. The guide tube 11 extends to the middle of the transparent portion 37, and the core-rod depressor 12 is extending to the same extent too. Further, a stopper 61 on which the core-rod depressor 12 is seated is disposed adjacent to the bottom of the guide tube 11. A hole 60 into which the depressing rod 71 enters is defined in the bottom of the tube 11. The depressor-pulling spring 45 and the depressor-pushing spring 39 are loaded on the depressor 12 to allow upward and downward movements of the core-rod depressor 12. Further, the depressing rod 71 for pushing the core-rod depressor 12 is provided as a component of the lower depressor-adjustment sub-unit 23.

Figure 7A:
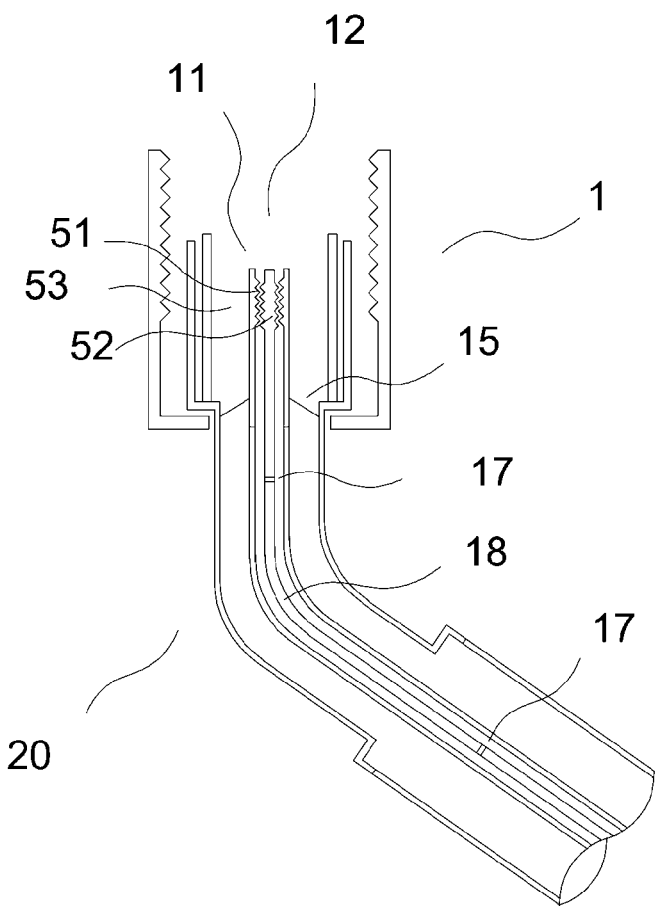
FIG. 7A shows a sectional view of a coupler.
Figure 7B:
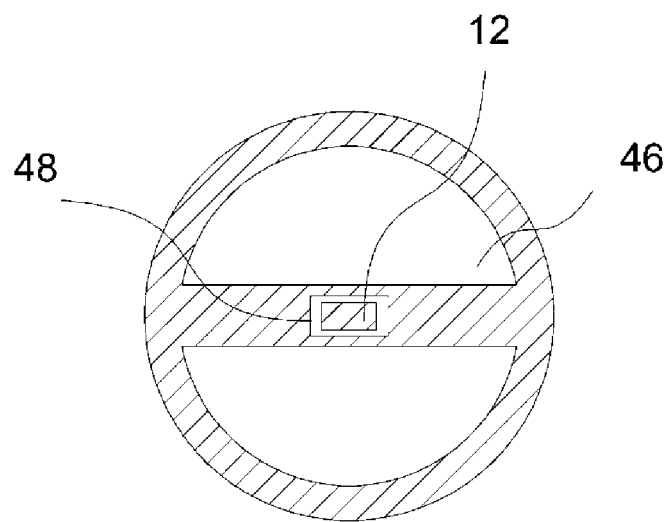
FIG. 7B shows a sectional of a depressor-adjustment unit in accordance with a third embodiment of the present disclosure.
Figure 8:
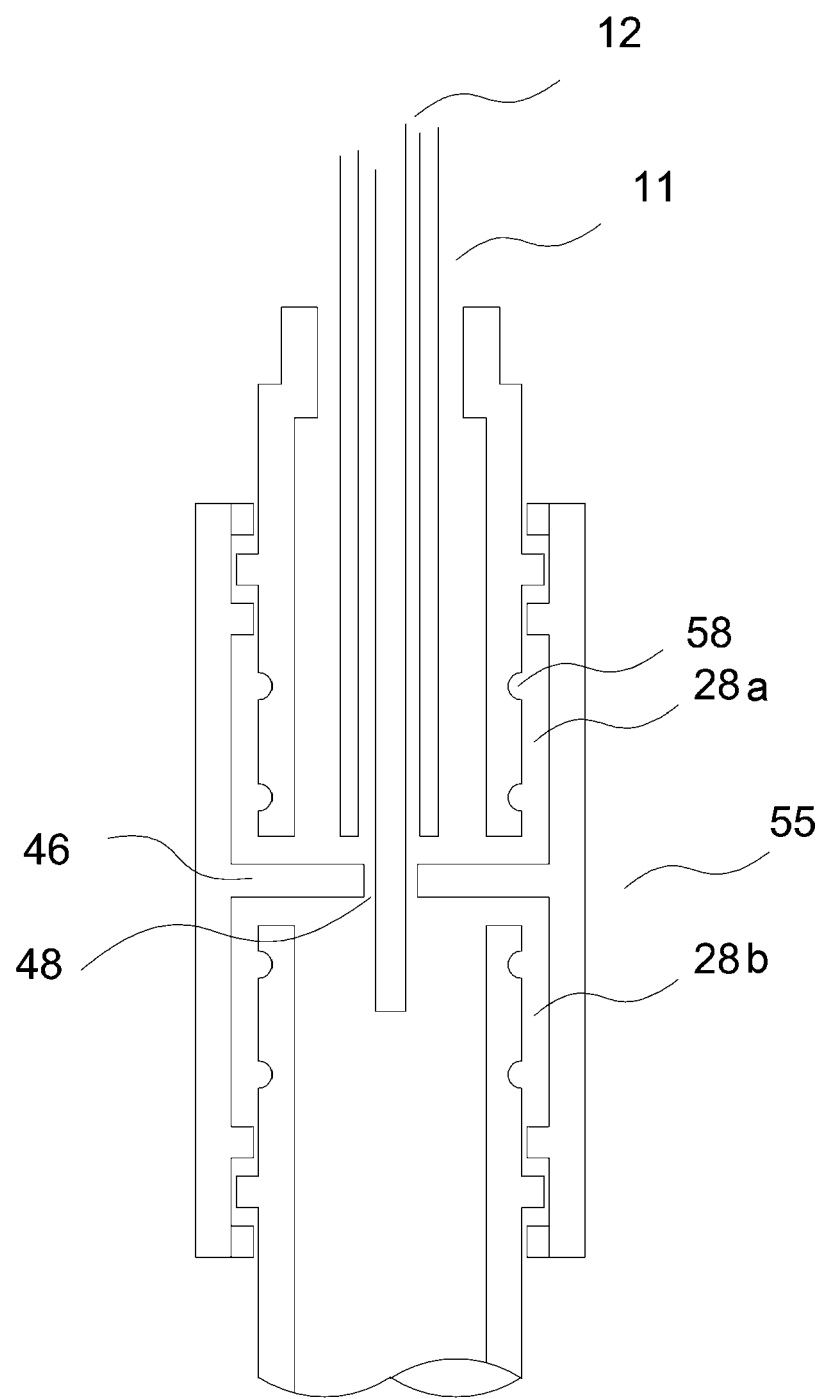
FIG. 8 shows a sectional view of a depressor-adjustment unit in accordance with a third embodiment of the present disclosure.

In a third embodiment, as shown in FIGS. 7A, 7B, and 8, the inner female thread 51 and the second outer male thread 52 are defined on the inner face of the guide tube and on the outer face of the coupler 1 of the core-rod depressor 12, respectively. The inner female thread 51 and the second outer male thread 52 are rotatably engaged with each other. The depressor-adjustment unit 3 is disposed at the middle of the hose 6, thereby dividing the hose 6 into two portions. The first and second plungers 28a, 28b, as shown in FIG. 8, are coupled at the two portions of the hose 6 respectively. The rotatable cylinder portion 55 receives both of the plungers 28 to connect the plungers 28 to each other. The plungers 28 and the rotatable cylinder portion 55 may be rotatably coupled with each other. Each of the plungers 28 and the rotatable cylinder portion 55 may be hollow. A separation preventing protrusion may be provided to prevent separation between the plungers and cylinder portion. Further, a packing member receiving groove 58 is defined on the outer face of each plunger. The packing member 27 is received in the groove, thereby to hermetically seal the plungers 28. An adjustment plate 46 is transversely disposed in the rotatable cylinder portion 55. A rectangular through-hole 48 is laterally defined on the adjustment plate 46. One end of the core-rod depressor 12 at the depressor-adjustment unit 3 is defined in a rectangular shape. The rectangular end is inserted into the through-hole 48 to move reciprocally in association with the rotation of the rotatable cylinder portion 55.

Figure 9A:
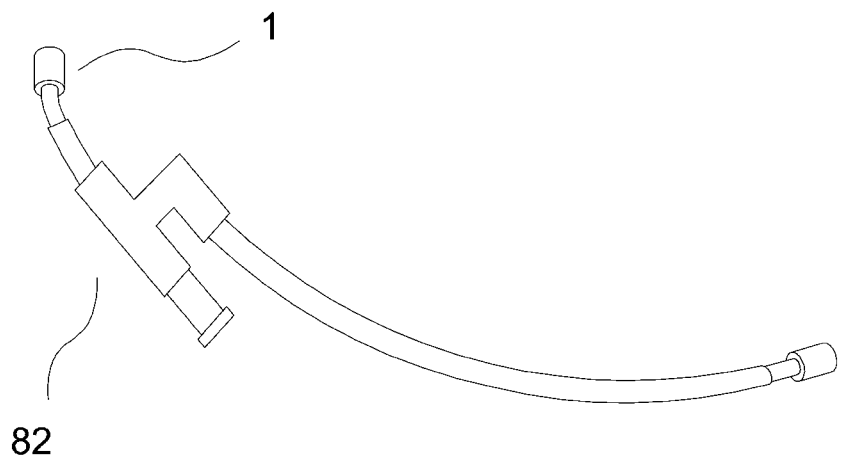
FIG. 9A shows a perspective view of a hose having a bent portion.
Figure 9B:
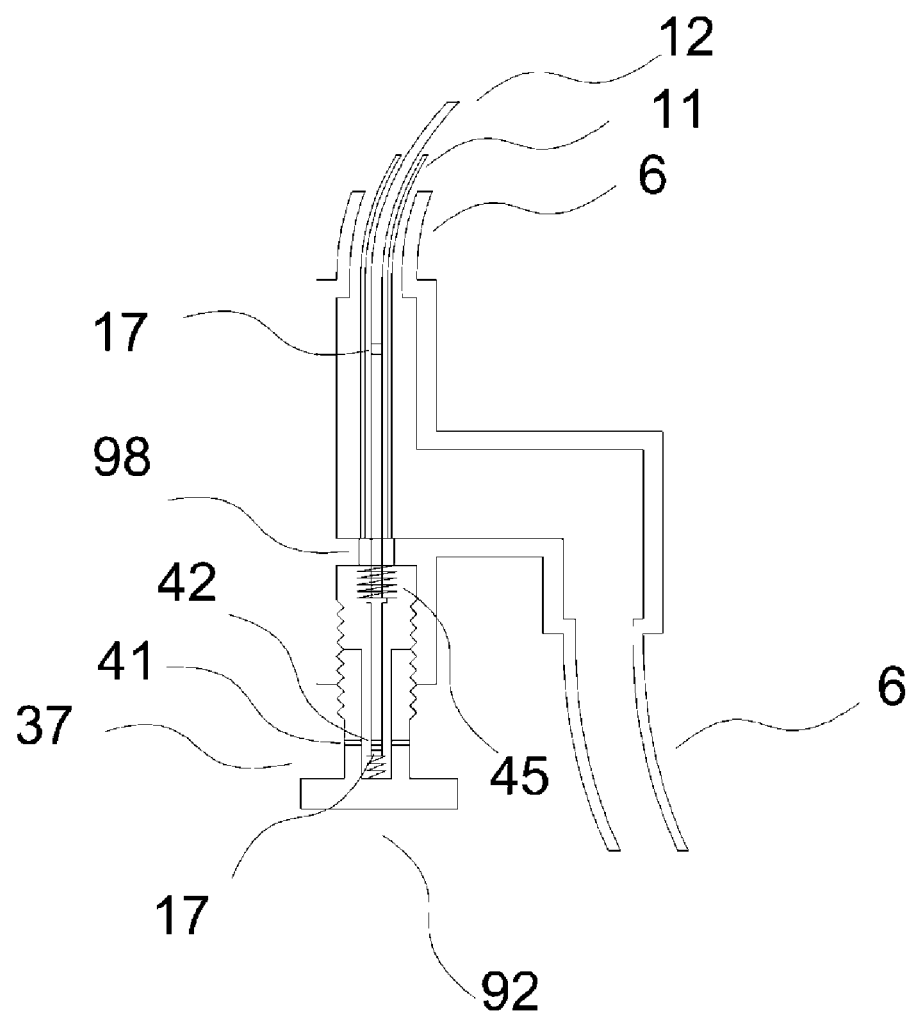
FIG. 9B shows a partial sectional view of a depressor-adjustment in accordance with a fourth embodiment of the present disclosure.

In a fourth embodiment, as shown in FIGS. 9A and 9B, a manifold gauge set may include a hose 6; a bent portion 82 having a first end coupled to a distal end of the hose; a coupler 1 coupled to a second end of the bent portion, wherein the first and second ends are opposite to each other, wherein the coupler is detachably coupled to a gas inlet/outlet valve 7; and a depressor-adjustment unit 3 disposed on the hose at the first end of the bent portion; and a movable depressor 12 extending through the coupler and the bent portion to the depressor-adjustment unit. A packing member 98 is disposed in a hollow portion of the bent portion 82 at a position which meets the core-rod depressor 12, thereby to maintain the airtightness. A rotation handle 92 is included as an component of the depressor-adjustment unit 3. One end of the depressor-pushing spring 39 is connected to one end of the core-rod depressor 12, while the other end of the depressor-pushing spring 39 is connected to one end of the rotation handle 92. A depressor-pulling spring 46 is configured to allow the core-rod depressor 12 return to the original position. The transparent portion 37 is provide as described above. Since the core-rod depressor does not need to be rotated, the connection between the core-rod depressor and spring 39 may be embodied as the rotatable connection 17. The configuration of the coupler is the same as that in the first embodiment. In this embodiment, the hose 6 is bent twice. The hose 6 does not need to have an elastic portion. The rest of the configuration thereof is similar to that in the other embodiments above. The discharge fold may be coupled to the bent portion to discharge residual gas.

Figure 10A:
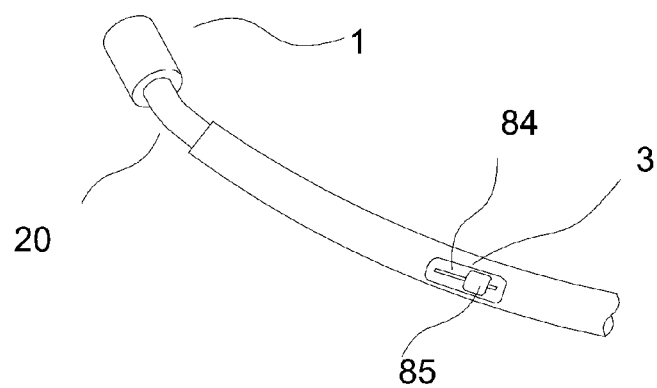
FIG. 10A shows a partial perspective view of a hose.
Figure 10B:
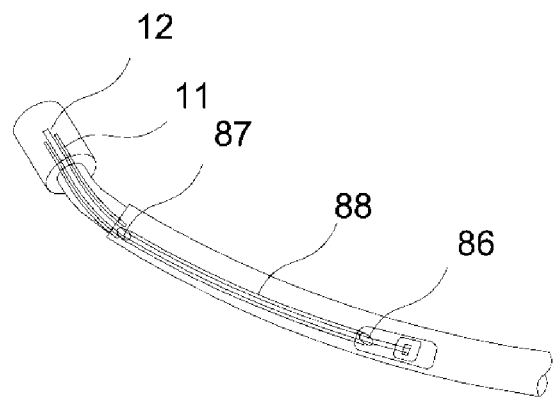
FIG. 10B shows an internal view of the hose.
Figure 10C:
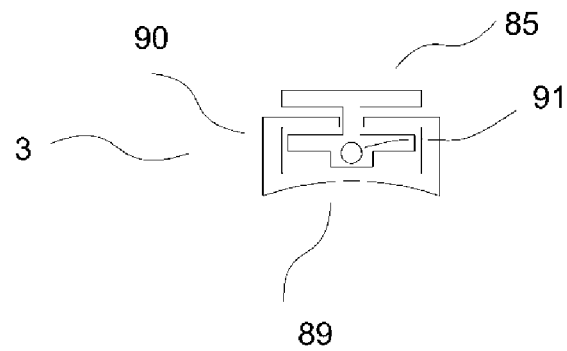
FIG. 10C shows a sectional view of a depressor-adjustment unit in accordance with a fifth embodiment of the present disclosure.

In a fifth embodiment, as shown in FIGS. 10A, 10B, and 10C, a manifold gauge set may include a hose 6 having a coupler 1 at a distal end thereof, wherein the coupler is detachably coupled to a gas inlet/outlet valve 7; an elongated hollow tube 88 extending in the hose in a longitudinal direction thereof, wherein an extension axis of the tube is angled with an extension axis of the hose; a movable depressor 12 extending in the tube along the extension axis of the tube; and a depressor-adjustment unit 3 configured to adjust a position of the depressor, wherein the unit is coupled to the hose. A guide tube 11 for guiding the core-rod depressor 12 from the coupler 1 to a distal opening 87 of the elongated hollow tube 88 is provided. The guide tube 11 may be present only in a necessary region. The elongated hollow tube 88 may also act as the guide tube 11 of the core-rod depressor 12. The packing member is disposed between the elongated hollow tube 88 and the core-rod depressor 12 to maintain airtightness therebetween. A lubricant may be present between the elongated hollow tube 88 and the core-rod depressor 12 so that the core-rod depressor 12 may move smoothly. A packing member may be provided on the distal opening 87 and the proximal opening 86 to prevent oil leakage and contamination. The core-rod depressor 12 may have different portions made of different materials. The depressor-adjustment unit 3 includes a body 90 having an adhering face 89 adhered to the surface of the hose 6, and an adjustment button portion 85 sliding along and in a slit 84 defined at the center of the body 90. Further, a connector 91 connected to the core-rod depressor 12 is disposed at the bottom of the adjustment button portion 85. The body has a stopper to control the movement thereof. Thus, when the adjustment button 85 is pressed, the body moves. When the button is released, the body stops by the stopper.

A sixth embodiment will be described without any drawings. The configuration thereof is largely the same those in the third embodiment and the fifth embodiment. That is, as in the third embodiment, a second inner female thread 51 is defined in the guide tube 11 at the coupler 1 side, while a second outer male thread 52 is defined in the core-rod depressor 12. The elongated hollow tube 88 in the fifth embodiment is disposed in the hose 6. The core-rod depressor 12 at the depressor-adjustment unit 3 side has a handle coupled thereto. The handle is rotated so that the second outer male thread 52 rotates in an engaged state with the second inner female thread 51 to move the core-rod depressor 12.

Figure 11:
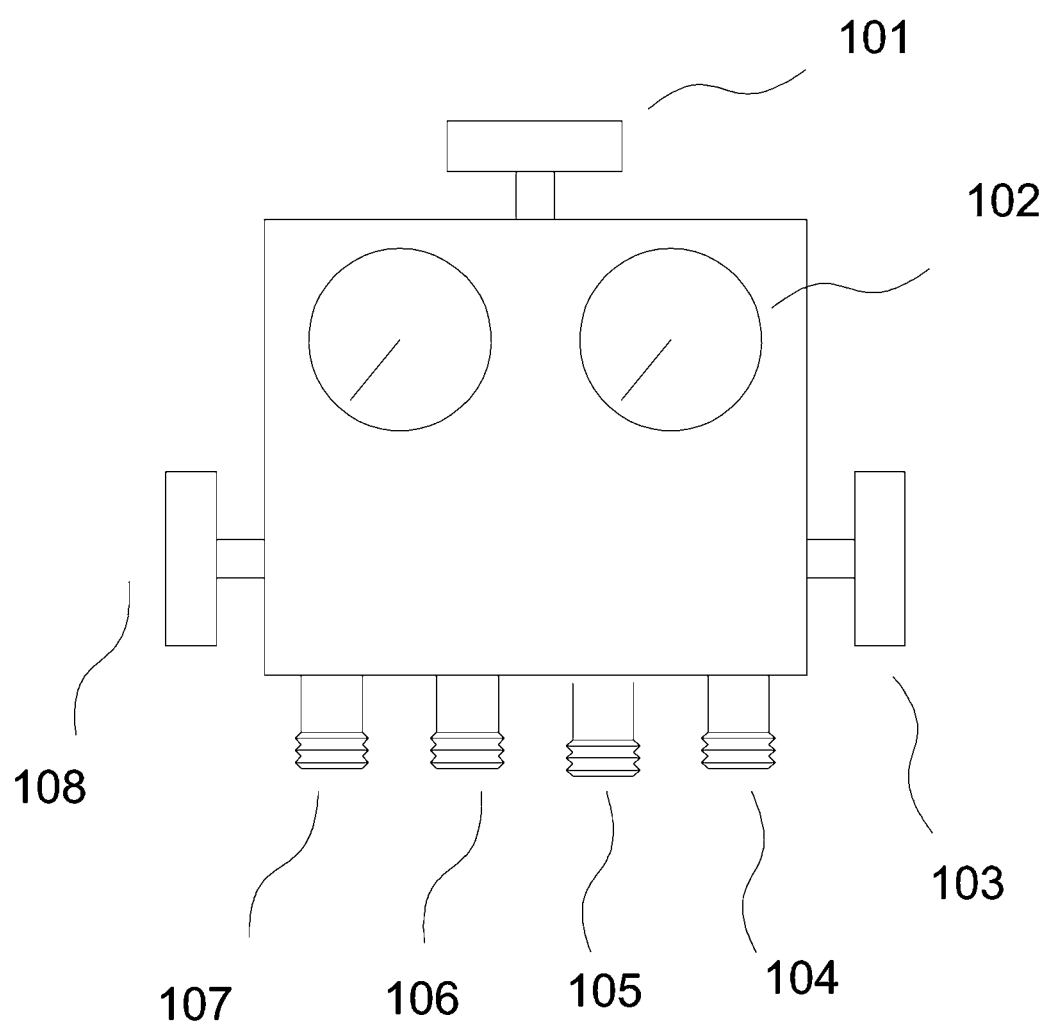
FIG. 11 shows a front view of a manifold gauge including a discharge fold in accordance with a seventh embodiment of the present disclosure.

In a seventh embodiment, FIG. 11 shows an addition of an exhaust fold to the body of the manifold gauge set. Conventionally, the manifold gauge set is composed of a low pressure fold 107, an injection fold 106, and a high pressure fold 104. When the depressor-adjustment unit is disposed in the manifold gauge, the gas remains in the hose 6 of the manifold gauge set after the gas discharging/injection is completed and, then, the core-rod 9 is returned to the original state by retracting the core-rod depressor 12. Thus, in accordance with the present disclosure, the discharge fold 105 and an associated discharge fold adjustment unit 101 may be further configured to discharge the residual gas safely. The exhaust fold and the discharge fold adjustment unit may be coupled to the body of the manifold gauge set or may be coupled to the hose 6.

The present disclosure makes it possible to easily manage gas when the coupler is coupled to the gas inlet/outlet valve. Thus, the present disclosure may be used in various fields.

What is claimed is:

1. A gas injection hose comprising:
a hose (6) having a coupler (1) at a distal end, wherein the coupler is detachably coupled to a gas inlet/outlet valve (7) of a thermal exchange apparatus;
a movable depressor (12) disposed in the coupler, wherein the depressor is configured to depress a valve core (9), wherein the valve core is disposed in the valve 7 to open or close the valve, wherein the depressor (12) extends from the coupler into the hose in a length direction of the hose (6); and
a depressor-adjustment unit (3) disposed on a middle region of the hose (6), wherein the depressor-adjustment unit (3) is configured to allow forward or reward movement of the depressor (12) toward or away from the valve core (9),
wherein when the coupler (1) is coupled to the valve (7), a depressed extent of the depressor (12) is adjusted by the depressor-adjustment unit (3), and
wherein the hose (6) is divided into first and second sub-hoses with the depressor-adjustment unit (3) being interposed between the first and second sub-hoses, wherein the depressor-adjustment unit (3) includes first and second hollow plungers (28a, 28b) coupled to the first and second sub-hoses respectively; and a rotatable hollow cylinder (55) constructed to receive the first and second plungers (28a, 28b), wherein the plungers (28a, 28b) are slidably received in the cylinder (55), wherein an adjustment plate (46) is received in the cylinder and is integral with the cylinder, wherein the plate (46) has a rectangular hole (48) through which the depressor (12) passes, wherein the depressor (12) is received in a guide tube (11), wherein the depressor is partially thread-coupled to the tube (11), wherein a rotation of the cylinder (55) allows a rotation of the depressor (12) to allow forward or reward movement of the depressor (12) toward or away from the valve core (9) along the tube (11).

* * * * *